Patented Jan. 14, 1941

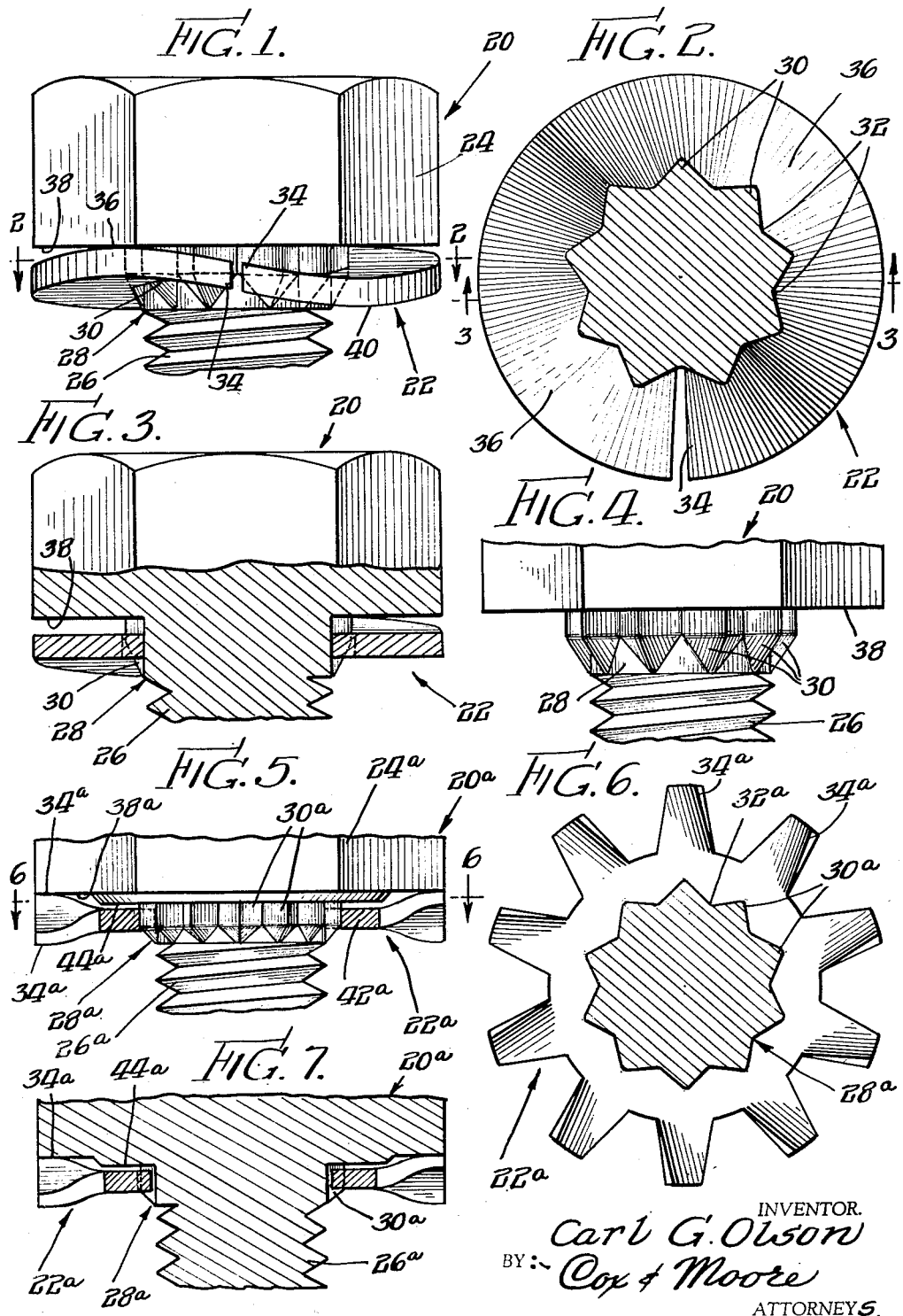

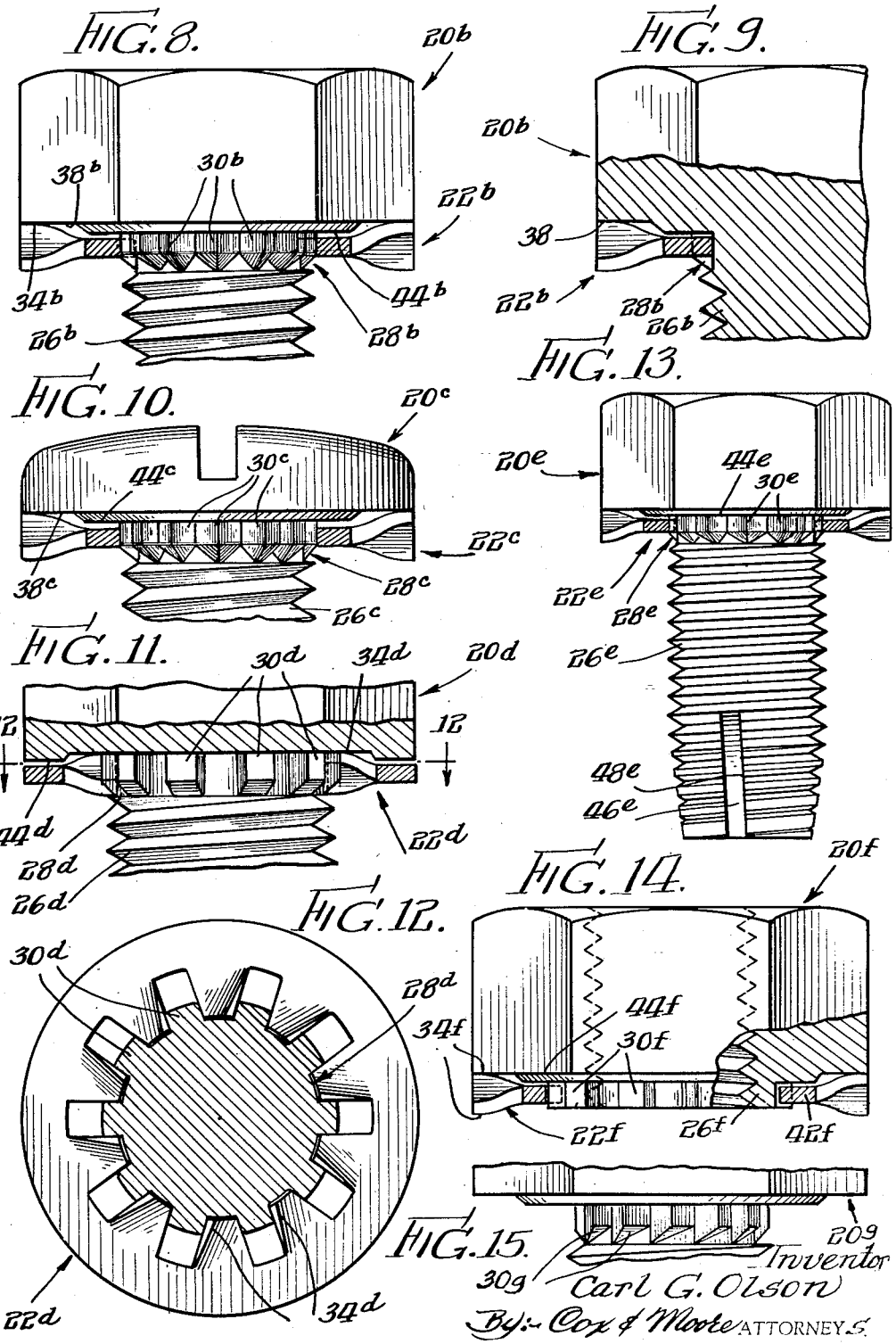

2,228,284

UNITED STATES PATENT OFFICE 2,228,284

FASTENER DEVICE

Carl G. Olson, Chicago, Ill., assignor to Illinois Tool Works, Chicago, Ill., a corporation of Illinois Application February 7, 1939, Serial No. 255,082

16 Claims. (Cl. 151—32)

This invention relates generally to fastener devices, and more particularly to fastener devices of the lock washer and screw variety.

More specifically, the invention contemplates locking devices, such as lock washers, designed for interlocking association with a complementary peripheral section of the screw stem or shank in the vicinity of the clamping surface of the screw head. The invention contemplates the interlocking of lock washers in operative association with the underside of a screw head either before or after the thread has been provided on the screw shank.

It is also an object of the present invention to provide lock washers which may be used with hardened screws such as thread-forming or thread-cutting screws. In such screws the clamping surface of the screw head may be too hard to permit the embedding of lock washer teeth, and, by providing an interlock between the inner margin of the lock washer and the complemental peripheral section of the screw shank, the lock washer and screw are secured against relative rotative movement due to the coaction between the preformed inner marginal section of the lock washer and the preformed peripheral section of the screw shank in the vicinity of the clamping surface of the screw head.

The invention is also contemplated for use with rotary clamping devices such as nuts provided with a peripheral section at the clamping side thereof having a surface configuration which is complemental to the surface configuration provided along the inner margin of a companion lock washer.

The foregoing and numerous other objects and advantages will be more apparent from the following detail description when considered in connection with the accompanying drawings, wherein—

Figure 1 is a side elevational view of a combined split-ring type lock washer and screw embodying interlocking lock washer marginal configurations and complemental peripheral screw configurations which enable these associated parts to rotate together as a unit;

Figure 2 is a transverse sectional view taken along the line 2—2 of Figure 1, the lock washer being shown in elevation, to more clearly illustrate the complemental interlocking relationship of the inner margin of the lock washer and peripheral lock washer receiving section of the screw;

Figure 3 is a vertical sectional view taken substantially along the line 3—3 of Figure 2;

Figure 4 is an elevational view of the screw of Figures 1, 2, and 3 with the lock washer detached therefrom;

Figure 5 discloses the application of a toothed lock washer of the continuous body type interlocked with peripheral ribs provided on the screw shank, the lock washer being shown in section and the screw in elevation to more clearly illustrate its interlocking relationship with the complemental elements or ribs of the screw shank;

Figure 6 is a transverse sectional view taken substantially along the line 6—6 of Figure 5, the lock washer being shown in elevation;

Figure 7 is a central vertical sectional view disclosing the screw and lock washer of Figures 5 and 6 with a loose fit between the inner margin of the lock washer and the complementary peripheral section of the screw shank;

Figure 8 discloses an interlocked screw and lock washer contemplated by the present invention, wherein the inner diameter of the lock washer is smaller than the external diameter of the screw shank, and hence is applied to the screw prior to the extruding or rolling of the thread on the screw shank;

Figure 9 is an enlarged fragmentary sectional view of the screw and lock washer shown in Figure 8 to more clearly illustrate the interlocking structural arrangement of the parts;

Figure 10 discloses the application of the invention to screws having slotted heads as distinguished from the hexagon heads shown in Figures 1 to 9, inclusive;

Figure 11 is a side elevational view, shown partly in section, illustrating the manner in which internal toothed lock washers may be interlocked with a complementary peripheral section of the screw shank;

Figure 12 is a transverse sectional view taken substantially along the line 12—12 of Figure 11;

Figure 13 discloses the application of the invention to thread-cutting screws;

Figure 14 illustrates a lock washer and nut interlocked in accordance with the teachings of the present invention; and Figure 15 is a fragmentary side elevation of a screw equipped with splines or teeth of slightly modified form, which insures automatic registration with complementary splines in the washer without relative rotation between the parts during the initial assembly thereof.

Referring now to the drawings more in detail, it will be noted that like numerals have been employed to designate similar parts throughout the various figures.

In Figures 1 to 3, inclusive, I have disclosed the invention as applied to the combination of split-ring type washer with headed screws. A screw member is designated generally by the numeral 20, and a split-ring type lock washer is designated generally by the numeral 22. The screw member 20 includes a head 24 and a threaded screw shank 26. The upper portion of the threaded shank 26 is provided with a peripheral lock washer receiving section 28. This section 28 includes a plurality of ribs or protuberances 30 designed to interlock with complementary inner marginal configurations 32 on the lock washer 22.

Thus the lock washer receiving section 28 is polygonal or multi-sided in cross-sectional contour, and likewise the inner margin of the lock washer 22 in plan presents a configuration which is complemental to the protuberances 30. Attention is directed to the fact that the split-ring washer 22 includes locking teeth 34 which, because of the undulated configuration of the lock washer body, are adapted to be shifted in opposite directions away from each other when the screw head 24 is rotated in a tightening direction. The lock washer 22 is provided with a crest surface 36 on one side which is designed to be engaged by the clamping surface 38 of the screw head 24, and a crest surface 40 which is designed to engage a complementary work surface (not shown). It will also be noted that the washer body includes crest surfaces positioned diametrically with respect to the crest surfaces 36 and 40. The undulated or corrugated arrangement of the lock washer body is best illustrated in the plan view thereof as shown in Figure 2. If the lock washer is to be preassembled with the screw so as to provide a fastener unit which may be transported from the place of manufacture to the place of ultimate use without any danger of the lock washer and screw becoming separated, a tight, frictional fit between the interlocking portions of the screw and lock washer is employed. If, on the other hand, the lock washer and screw are brought together at the place of application, a tight, frictional interlock between the parts may not be necessary.

From the foregoing it will be apparent that the invention contemplates preforming the inner margin of the lock washer body so as to render said margin particularly adaptable for interlocking with complementary peripheral surfaces or elements on the screw shank. This construction positively prevents relative rotation between the screw and lock washer when the parts are assembled, and hence enables the lock washer to be used with hardened as well as unhardened screws. Although the interlock between the lock washer and a hardened screw head would depend entirely upon the coaction between the inner margin of the lock washer and complementary peripheral portions of the screw shank, as distinguished from the embedding or locking engagement of the washer tooth with the clamping surface of the screw head, the oppositely disposed locking tooth 34 is free to embed itself within the softer work piece (not shown), against which the lock washer is to be clamped.

The application of the present invention to lock washers of the continuous body type is illustrated in Figures 5 and 6. In these figures a screw designated generally by the numeral 20a is interlockingly combined with a lock washer designated generally by the numeral 22a. This lock washer includes an inner continuous body portion 42a which is provided with inner marginal configurations or locking elements 32a designed to interlock with companion elements 30a provided on a lock washer receiving section 28a of a threaded shank 26a. Resilient oppositely disposed locking teeth 34a are provided along the outer margin of the washer, the teeth on one side of the body being designed to engage the clamping surfaces 38a of the head 24a. In order to prevent complete flattening or untwisting of the marginal prongs of the lock washer, I prefer to provide an annular surface 44a, which is spaced slightly beyond the clamping surface 38a of the screw head. Thus, when the surface 44a is shifted into clamping engagement with the complementary upper surface portion of the body 42a and the nut and washer are tightened against a work piece (not shown), further flattening or untwisting of the lock washer teeth is prevented.

The elements or ribs 30a, like the ribs 30 previously described, coact or interlock with the companion sections 32a of the lock washer to prevent relative rotation between the lock washer and the screw. As previously stated in connection with the lock washer 22, the interlock between the lock washer 22a and the screw shank can be made sufficiently tight to prevent inadvertent axial separation of the screw head and lock washer, or, in instances where a tight fit is not required, sufficient clearance may be provided. In Figure 7 I have shown the lock washer 22a of Figures 5 and 6 provided with sufficient clearance along the inner margin thereof so as to enable convenient assembly and disassembly of the screw and lock washer. In any of these forms the lock washer and screw are secured against relative rotation, and hence the lock washer is rendered functionally operative when used with hardened or unhardened screws. That is to say, the interlock between the washer and screw which prevents relative rotation between these parts does not depend upon the embedding of the teeth of the lock washer within the clamping surface of the nut, but rather between the engagement of the preformed elements along the inner margin of the lock washer with the complementary elements provided on the lock washer receiving portion of the screw shank. The resilient lock washer teeth, however, oppositely disposed from the clamping surface of the screw head, are free to lockingly engage or embed themselves within the surface of the work (not shown). It will also be noted that the elements or ribs provided along the periphery of the screw in the vicinity of the clamping surface are preferably short so as not to interfere with the stock of the work piece in the vicinity of the aperture into which the screw shank is to be inserted. It is desirable to taper the lower extremities of the elements or ribs 30—30a in order to facilitate initial registration thereof with the companion V-shaped recesses in the lock washer. Obviously the invention is not limited to the specific form of rib disclosed herein, but is capable of other modifications and changes which come within the scope of the claims appended hereto.

Figure 8 discloses the manner in which the invention may be applied to a preassembled screw and lock washer wherein the thread is extruded or rolled after the lock washer has been preliminarily associated with the interlocking elements under the screw head. The screw is indicated generally by the numeral 20b and the lock washer is designated generally by the numeral 22b. All the other elements of the combination bear numbers followed by the letter "b," said numbers corresponding with those used in connection with Figures 1 to 7, inclusive. It will be noted that in the lock washer 22b the inner diameter is less than the external diameter of the thread on the screw shank, said thread being extruded or rolled after the inner margin of the lock washer has been interlocked with the elements 30b of the screw shank. Figure 9 is an enlarged fragmentary sectional view which serves to more clearly illustrate the interlocking disposition of the inner margin of the washer and the peripheral elements of the screw shank.

Figure 10 discloses the manner in which the present invention is adaptable for use on screws having heads other than the hexagonal heads shown in Figures 1 to 9, inclusive, the screw of Figure 10 being designated generally by the numeral 20c and the lock washer by the numeral 22c.

In Figures 11 and 12 I have shown how the invention may be applied in the use of internally toothed lock washers. In these figures a screw designated generally by the numeral 20d is combined with an internally toothed lock washer 22d. The internal prongs of the lock washer 22d are interlocked with elements or ribs 30d provided on the locker washer receiving section 28d of the screw shank 26d. The complete flattening or untwisting of the lock washer prongs is prevented due to the presence of an annular surface 44d, which corresponds with the annular surface 44a previously described. The lock washer prongs may be tightly or loosely interlocked with the complementary elements 30d, as the case may demand.

In Figure 13 I have illustrated the practical application of the present invention to a thread-forming or thread-cutting screw. The screw is designated generally by the numeral 20e and the lock washer is designated generally by the numeral 22e. The lower extremity of the screw shank 26e is provided with a recess 46e which presents a cutting edge 48e. The screw 20e is preferably hardened so as to enable it to form its own thread in an unthreaded aperture of hard material, such as soft iron or soft steel. The various elements in the combination are given numerals corresponding to the numerals previously applied to corresponding elements and are followed with the letter e.

Figure 14 discloses the application of the present invention to a nut as distinguished from a screw. The nut in Figure 14 is designated generally by the numeral 20f and the lock washer by the numeral 22f. The clamping side of the screw head is provided with a shank portion 26f having ribs or protuberances 30f designed to interlock with complementary elements or sections provided along the inner margin of the lock washer body 42f.

In Figure 15 I have disclosed a screw 20g provided with slightly modified splines or ribs 30g. It will be noted that these splines 30g at the lower extremities differ structurally from the splines or ribs previously described, in that the splines 30g along their left or advancing side, as viewed in Figure 15, have a surface which is parallel with the axis of the screw; that is, the lower portion of the splines 30g are truncated prisms. Stating it another way, only one side— namely, the trailing side of each spline at its lower portion—is tapered or inclined out of parallelism with the screw axis.

By employing splines as shown in Figure 15, positive and automatic registration thereof with the complementary teeth or splines in the lock washer is insured without experiencing relative rotation in a given direction between the parts. Thus, the instant that the advancing surfaces of the splines 30g contact the washer stock, registration of the parts takes place with no further relative rotation. This arrangement is particularly advantageous in instances where the screw head is brought down upon a lock washer resting upon the work because under such circumstances no rotative adjustment of the parts is required to assure registration of the complementary splines or teeth.

From the foregoing it will be apparent that the present invention contemplates an improved fastener device in which both the lock washer and screw element possess novel structural features. The interlocking of the lock washer with the screw, as herein described, may be accomplished by the practice of simple and inexpensive machine shop methods. The protuberances or ribs beneath the screw head may be extruded upon the screw shank during the heading operation, that is, during the period of forming the head at one extremity of the screw shank. The teeth along the inner margin of the washer body may be produced by simple stamping operations. The invention not only enables lock washers and screws to be preassembled in a very expeditious manner, but also opens an entirely new field for the use of lock washers, namely, the use of lock washers with hardened screws.

While certain specific structural features have been disclosed herein, it will be understood that the invention contemplates other features of construction which come within the scope of the following claims. For example, I have disclosed herein a specific arrangement of spline elements on the screw shank which are complemental to and adapted to interlock with spline elements formed along the inner margin of the washer body. These spline elements, when viewed in plan, are of V-shaped form, but obviously the invention is not limited to this specific V-shaped form, but contemplates other forms of serrations or spline elements which come within the scope of the claims appended hereto.

Having thus described my invention, what I claim as new and desire to secure by Letters Patent is:

1. A fastener device including a screw member having a threaded stem and a head at one extremity thereof, a lock washer receiving section on said stem adjacent the clamping side of the screw head, said section having peripherally disposed and circumferentially spaced elements, and lock washer positioned adjacent said head and having a body portion, a plurality of resilient work engaging locking teeth spaced along the inner margin of said body portion, said teeth interlocking with the elements on said lock washer receiving section of the stem to secure said lock washer and screw against relative rotation.

2. A fastener device including a screw member having a threaded stem and a head at one extremity thereof, a lock washer receiving section on said stem adjacent the clamping side of the screw head, said section having peripherally disposed and circumferentially spaced elements, and a lock washer positioned adjacent said head and having a body portion, a plurality of twisted prongs presenting oppositely disposed resilient locking teeth, said prongs being spaced along the inner margin of said body portion and interlocking with the elements on said lock washer receiving section of the stem to secure said lock washer and screw against relative rotation.

3. A fastener device comprising a screw member having a threaded stem, a head at one extremity thereof, and a peripheral lock washer receiving section between said head and the thread on said stem, including a plurality of relatively short longitudinal ribs, one side of each rib extending in substantial parallelism with the screw axis, and the opposite side of each rib as it extends away from the head being inclined out of parallelism with said screw axis, whereby to facilitate initial registration of said ribs with complementary ribs in a lock washer.

4. A fastener device including a screw member having a threaded stem and a head at one extremity thereof, a lock washer receiving section adjacent the clamping side of the screw head, and a lock washer positioned adjacent said head, said lock washer having a resilient locking tooth for engaging a work surface, the inner margin of said lock washer and the lock washer receiving section of the screw member having a preformed interlocking projection and recess coupling construction to couple said lock washer and screw member for joint rotation, said coupling construction being arranged to insure initial automatic projection and recess registration as said screw member and lock washer are telescopically associated, the portion of said coupling construction on the screw member being of relatively short axial extent, the inner portion of the washer being frictionally secured against axial displacement, whereby to present a screw and lock washer fastener unit.

5. A fastener device including a screw member having a threaded stem and a head at one extremity thereof, a lock washer receiving section adjacent the clamping side of the screw head, and a lock washer positioned adjacent said head, said lock washer having a resilient locking tooth for engaging a work surface, the inner margin of said lock washer and the lock washer receiving section of the screw member having a coupling construction including a plurality of annularly disposed preformed interlocking projections and recesses to couple said lock washer and screw member for joint rotation, said coupling construction being arranged to insure initial automatic projection and recess registration as said screw member and lock washer are telescopically assembled, the portion of said coupling construction on the screw member being of relatively short axial extent, the inner portion of the washer being frictionally secured against axial displacement, whereby to present a screw and lock washer fastener unit.

6. A fastener device including a screw member having a threaded stem and a head at one extremity thereof, a lock washer receiving section adjacent the clamping side of the screw head, and a split ring lock washer positioned adjacent said head, said lock washer having a resilient locking tooth for engaging a work surface, the inner margin of said lock washer and the lock washer receiving section of the screw member having a preformed interlocking projection and recess coupling construction to couple said lock washer and screw member for joint rotation said coupling construction being arranged to insure initial automatic projection and recess registration as said screw member and lock washer are telescopically assembled, the portion of said coupling construction on the screw member being of relatively short axial extent.

7. A fastener device including a screw member having a threaded stem and a head at one extremity thereof, a lock washer receiving section adjacent the clamping side of the screw head, and a split ring lock washer positioned adjacent said head, said lock washer having an undulated body and a resilient locking tooth for engaging a work surface, the inner margin of said lock washer and the lock washer receiving section of the screw member having a preformed interlocking projection and recess configuration to couple said lock washer and screw member for joint rotation.

8. A fastener device including a rotary threaded body having a clamping surface extending radially outward from the threaded portion of the body, a washer receiving shank portion extending axially beyond the clamping surface, and a washer of resilient material positioned adjacent said clamping surface, the inner margin of said washer and the washer receiving section of the threaded body having a preformed interlocking projection and recess configuration to couple said washer and body for joint rotation when said parts are telescopically associated with each other, said projection at a point farthest removed axially from said clamping surface being of reduced cross section to facilitate initial registration of said projection and complementary recess as said parts are telescopically assembled.

9. A fastener device including a rotary threaded body having a clamping surface extending radially outward from the threaded portion of the body, a washer received shank portion extending axially beyond the clamping surface, and a washer of resilient material positioned adjacent said clamping surface, said washer receiving section including relatively short axially disposed ribs, the inner margin of the washer being recessed to interlockingly receive said ribs so as to couple said washer and body for joint rotation when said parts are telescopically associated with each other, said ribs at a point axially removed from said clamping surface being of reduced cross section to facilitate registration of said ribs and complementary recess as said parts are telescopically assembled.

10. A fastener device including a screw member having a threaded stem and a head at one extremity thereof, a lock washer receiving section adjacent the clamping side of the screw head providing one portion of a spline coupling, and a lock washer positioned adjacent said head, said lock washer having a continuous body portion and a resilient locking tooth for engaging a work surface, the inner margin of said lock washer providing the other portion of the spline coupling complemental to the spline lock washer receiving section of the screw member, said spline coupling serving to secure the washer and screw member together as a rotatable unit and constructed and arranged to insure initial automatic registration of a spline element on one of the parts with a complementary spline recess on the other part as said parts are telescopically associated, the inner portion of the washer being secured against axial displacement whereby to present a screw and lock washer fastener unit, the portion of said spline coupling on the screw member being of relatively short axial extent but sufficient to accommodate the aforesaid lock washer.

11. A fastener device including a screw member having a threaded stem and a head at one extremity thereof, a lock washer receiving section adjacent the clamping side of the screw head providing one portion of a spline coupling, a lock washer positioned adjacent said head, said lock washer having a continuous body portion and a resilient locking tooth for engaging a work surface, the inner margin of said lock washer providing the other portion of the spline coupling complemental to the spline lock washer receiving section of the screw member, said spline coupling serving to secure the washer and screw member together as a rotatable unit and constructed and arranged to insure initial automatic registration of a spline element on one of the parts with a complementary spline recess on the other part as said parts are telescopically associated, and an extruded element on the screw member positioned beneath the lock washer to prevent axial displacement of the lock washer whereby to present a screw and lock washer fastener unit, the portion of said spline coupling on the screw member being of relatively short axial extent but sufficient to accommodate the aforesaid lock washer.

12. A fastener device including a screw member having a threaded stem and a head at one extremity thereof, a lock washer receiving section adjacent the clamping side of the screw head providing one portion of a spline coupling, and a lock washer positioned adjacent said head, said lock washer having a continuous body portion and a resilient locking tooth for engaging a work surface, the inner margin of said lock washer providing the other portion of the spline coupling complemental to the spline lock washer receiving section of the screw member, said spline coupling including a plurality of adjacent alternately arranged and uniformly distributed projections and recesses along the inner margin of the lock washer and a relatively short axially extending spline member beneath the head of said screw member which is complementary to any one of the recesses in said lock washer, said coupling serving to secure the washer and screw member together as a rotatable unit, the inner portion of the washer being secured against axial displacement whereby to present a screw and lock washer fastener unit.

13. A fastener device including a screw member having a threaded stem and a head at one extremity thereof, a lock washer receiving section adjacent the clamping side of the screw head providing one portion of a spline coupling, and a lock washer positioned adjacent said head, said lock washer having a resilient locking tooth for engaging a work surface, the inner margin of said lock washer providing the other portion of the spline coupling complemental to the spline lock washer receiving section of the screw member, said spline coupling serving to secure the washer and screw member together as a rotatable unit, and presenting annularly disposed axially extending recesses on the screw member bounded by outwardly flaring surfaces, the inner portion of the washer being secured against axial displacement whereby to present a screw and lock washer fastener unit.

14. A locking device including a lock washer, said lock washer having a body portion, resilient locking teeth carried by said body portion, and a plurality of spline members of V-shaped cross-section adjacently disposed and uniformly distributed along the inner margin of said lock washer, said spline members being designed for interlocking association with complementary spline members on a lock washer receiving portion of a rotary threaded fastener.

15. A fastening device including a rotary threaded body having a clamping surface extending radially outward from the threaded portion of said body, and a washer receiving section extending axially beyond said clamping surface, said washer receiving portion including a plurality of annularly disposed, relatively short, axially extending spline members adapted to interlock with complementary spline members provided along the inner margin of a washer, said spline members at a point removed from the clamping surface being reduced in cross section to facilitate registration with complementary recesses in a washer.

16. A fastener device including a screw member having a head and a peripheral shank portion in the immediate vicinity of said head for accommodating an aperture of a metallic sheet member, a metallic sheet member positioned adjacent the clamping surface of said head, the margin defining the aperture of said sheet member and the peripheral shank portion adjacent the head having a preformed interlocking projection and recess configuration to couple said sheet member and screw element against relative rotation when said parts are telescopically associated with each other, said projection at a point farthest removed axially from said head being of reduced cross-section to facilitate initial registration of said projection and complementary recess as said parts are telescopically assembled.

CARL G. OLSON.

CERTIFICATE OF CORRECTION.

Patent No. 2,228,284.  January 14, 1941.

CARL G. OLSON.

It is hereby certified that error appears in the printed specification of the above numbered patent requiring correction as follows: Page 3, first column, line 33, for the word "locker" read --lock--; and second column, line 63, claim 1, for "and lock" read --and a lock--; page 4, second column, line 42, claim 9, for "received" read --receiving--; and that the said Letters Patent should be read with this correction therein that the same may conform to the record of the case in the Patent Office.

Signed and sealed this 18th day of February, A. D. 1941.

(Seal)

Henry Van Arsdale,
Acting Commissioner of Patents.